J. C. MOORE.
VEHICLE SPRING AND MOUNTING.
APPLICATION FILED AUG. 25, 1915.
1,176,395.
Patented Mar. 21, 1916.
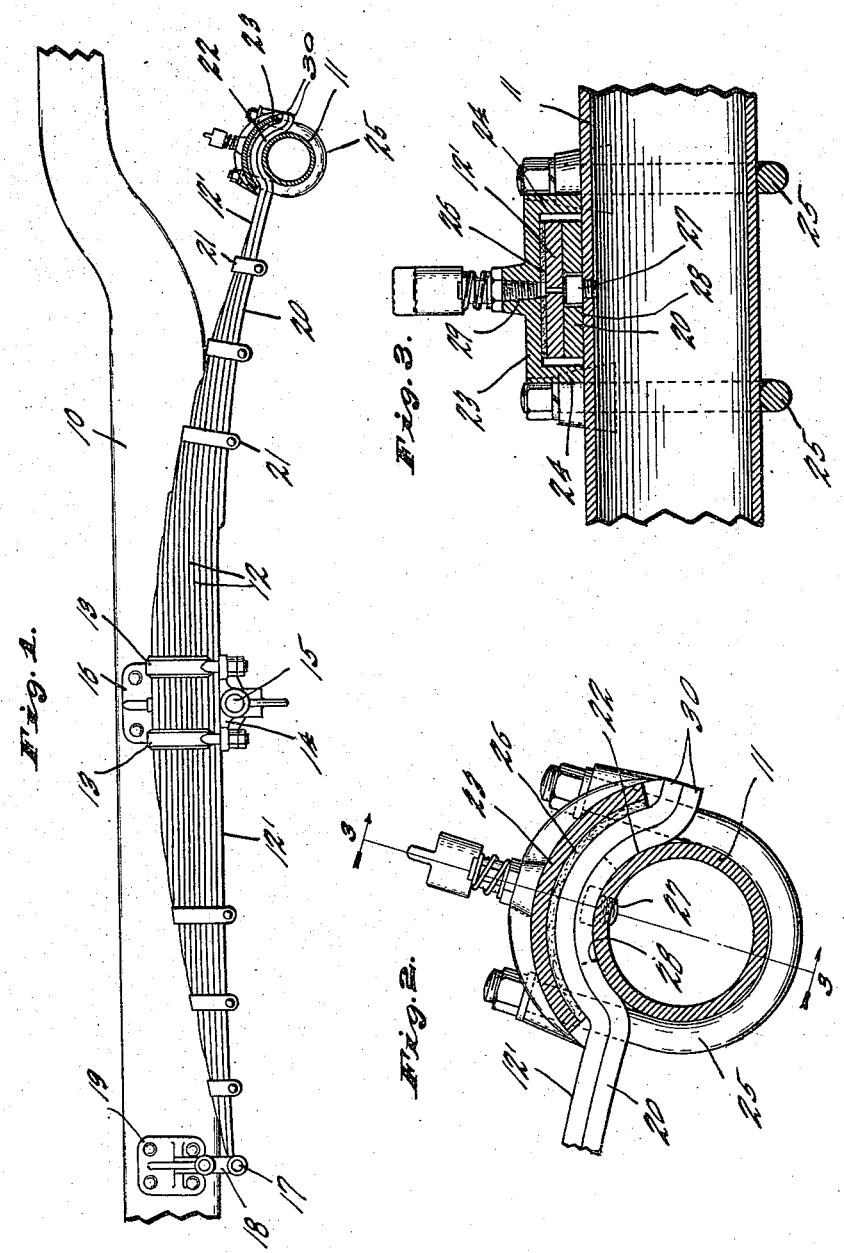
WITNESS
Frank A. Fahle
INVENTOR
John C. Moore,
BY
Hood & Schley
ATTORNEYS

UNITED STATES PATENT OFFICE.

JOHN C. MOORE, OF CONNERSVILLE, INDIANA.

VEHICLE-SPRING AND MOUNTING.

1,176,395. Specification of Letters Patent. Patented Mar. 21, 1916.

Application filed August 25, 1915. Serial No. 47,348.

*To all whom it may concern:*

Be it known that I, JOHN C. MOORE, a citizen of the United States, residing at Connersville, in the county of Fayette and State of Indiana, have invented a new and useful Vehicle-Spring and Mounting, of which the following is a specification.

My invention relates to the construction and mounting of cantaliver springs, especially for automobiles.

Cantaliver springs have been found to have many advantages in the mounting of an automobile frame on the rear axle, the center and the forward end of the spring being suitably attached to the frame, and the rear end of the spring being attached to the rear or driving axle of the automobile. On account of the driving and braking action on the rear axle, however, I have found that there is produced a continual bending of the spring at or about its point of attachment with the rear axle, which bending produces a crystallization at this point and eventually causes the spring to break there.

It is the object of my present invention to avoid this bending and the resultant crystallization. In doing this, I bow the end of the spring which is attached to the rear axle so that it fits upon such rear axle, and yieldingly clamp it to the rear axle so that it can slide circumferentially thereupon. I not only do this to the main or long leaf of the spring, but provide a supplemental leaf which is similarly bowed, and is clamped to the other leaves of the spring but does not extend to the clamp at the central or thickest portion of the spring by which such spring is attached to the frame.

The accompanying drawing illustrates my invention.

Figure 1 is a side elevation of a cantaliver spring and its mounting on the automobile frame and rear axle, in accordance with my invention, a mere fragment of the frame being shown and the axle and clamp being shown in section; Fig. 2 is an enlarged section through such axle and clamp, showing the spring end in elevation; and Fig. 3 is a section on the line 3—3 of Fig. 2.

The automobile frame 10 and the rear axle 11 are of any suitable construction. The cantaliver spring comprises a plurality of leaves 12, of successively shorter length toward the top, in the usual style. The leaves are clamped together at their center by clamps 13, which also clamp them to a plate 14 suitably carried by the frame 10, as by being mounted on a pin 15 carried by a plate 16 bolted to such frame. The main or longest leaf 12' of the spring is at the bottom, and its forward end is connected to a pivot pin 17 on the lower end of a link 18 hung from a plate 19 bolted to the frame 10. At its rear end a supplemental leaf 20 is clamped to the other leaves just below the bottom main leaf 12', as by clamps 21, but this supplemental leaf 20 does not extend to the central clamps 13. The bottom main leaf 12' and the supplemental leaf 20 are bowed at their rear ends to form a cradle 22, which fits over the upper part of the axle casing 11. This cradle 22 is located under a clamping plate 23 which at its edges has flanges 24 which extend down past the edges of the leaves 12' and 20 forming such cradle and bear against the axle casing 11, the plate 23 being held in place by U-bolts 25 which pass around the axle casing 11 and through suitable holes in such clamping plate. The flanges 24 are of greater depth than the combined thickness of the leaves 12' and 20, and between the upper surface of the plate 12' at the cradle 20 and the adjacent face of the clamping plate 23 there is a layer of leather 26 of sufficient thickness to hold the cradle 22 against rattling while still permitting it to slide circumferentially of the axle casing 11. Such cradle is prevented from sliding endwise of the axle casing by the head of a bolt 27, which bolt head projects upward into a slot 28 in the supplemental leaf 20 at the cradle 22. The clamping plate 23 is provided with a lubricant hole 29, which may be supplied with lubricant in any suitable manner and is normally closed.

In operation the inertia of the frame 10 and the vehicle body which it carries cause the cradle 22 to slide circumferentially around the axle casing 11 when there is either a power or a braking action on such axle, and this sliding of the cradle 22 avoids the sharp bending of the spring which takes place near its point of attachment when the spring is firmly fixed to the axle. The supplemental leaf 20 reinforces the bottom main leaf 12', but because it is not fastened by the clamps 13 it is permitted a slight longitudinal sliding so that there is no binding of the parts when the cradle 22 slides as stated above. The cradle 22 is prevented from sliding out of the clamping plate 23 by reason of the main portions of the leaves 12′ and 20, which extend forward from the rear axle, and by reason of out-turned tail portions 30 at the rear end of the cradle 22. The cradle 22 and clamping plate 23 are prevented from sliding longitudinally of the axle casing 11 by the bolt head 27 in the slot 28. The clamping plate 23 is prevented from rotation around the axle housing 22 should the U clamping bolts 25 become loose by reason of the out-turned tail portions 30 at the rear end of the cradle 22.

I claim as my invention:

1. In combination, a vehicle frame, an axle, a cantaliver spring formed of a plurality of leaves and attached at its middle and at one end to the frame, the other end of said spring being bowed to form a cradle which fits on said axle, and a clamp for holding said cradle against the axle while permitting it to slide circumferentially, the end of said spring which is attached to said axle being provided with a supplemental leaf which also is bowed to form part of the cradle which fits upon the axle and which is clamped to the other leaves of the spring but terminates short of the middle thereof.

2. In combination, a vehicle frame, an axle, a cantaliver spring attached at its middle and at one end to the frame, the other end of said spring being bowed to form a cradle which fits on said axle, and a clamp for holding said cradle against the axle while permitting it to slide circumferentially.

3. In combination, a vehicle frame, an axle, a cantaliver spring formed of a plurality of leaves and attached at its middle and at one end to the frame, the other end of said spring being bowed to form a cradle which fits on said axle, a clamping plate which fits over said cradle and has flanges which extend down past the edges of the spring parts forming such cradle to a bearing against the axle, and means for clamping such clamping plate to the axle with the flanges bearing against the axle.

4. In combination, a vehicle frame, an axle, a cantaliver spring attached at its middle and at one end to the frame, the other end of said spring being bowed to form a cradle which fits on said axle, a clamp for holding said cradle against the axle while permitting it to slide circumferentially, and interlocking means between the axle and the cradle for preventing the cradle from sliding longitudinally of the axle.

5. In combination, a vehicle frame, an axle, a cantaliver spring formed of a plurality of leaves and attached at its middle and at one end to the frame, the other end of said spring being bowed to form a cradle which fits on said axle, a clamping plate which fits over said cradle and has flanges which extend down past the edges of the spring parts forming such cradle to a bearing against the axle, means for clamping such clamping plate to the axle with the flanges bearing against the axle, and interlocking means between the axle and the cradle for preventing the cradle from sliding longitudinally of the axle.

6. As an article of manufacture, a leaf spring comprising leaves of successively longer length, the longest leaf being bowed at one end to provide an arc-shaped cradle, and a supplemental leaf bearing against such bottom leaf at the cradle end and also bowed to form part of the cradle but stopping short of the middle of the spring.

7. As an article of manufacture, a leaf spring comprising leaves of successively longer length, the longest leaf being bowed at one end to provide an arc-shaped cradle, and a supplemental leaf bearing against such bottom leaf at the cradle end and also bowed to form part of the cradle.

In witness whereof, I have hereunto set my hand at Connersville, Indiana, this 21st day of August, A. D. one thousand nine hundred and fifteen.

JOHN C. MOORE.